US012701299B2

(12) United States Patent     (10) Patent No.:     US 12,701,299 B2
Asuncion et al.                   (45) Date of Patent:         Aug. 4, 2026

(54) METHOD AND SYSTEM FOR STREAMING WITH REWARDS TRACKING AND ARCADE CONTENT

(71) Applicants: Sling TV L.L.C., Englewood, CO (US); DISH Network Technologies India Private Limited, Bengaluru (IN)

(72) Inventors: Shawn Asuncion, Parker, CO (US); Jonathan Lin, Denver, CO (US); Amit Kumar, Centennial, CO (US); Sharat Kumar Shivakumar, Bengaluru (IN); Seth VanSickel, Parker, CO (US); Kevin Holland, Littleton, CO (US); Gary Schanman, Cherry Hills Village, CO (US)

(73) Assignees: Sling TV L.L.C., Englewood, CO (US); DISH Network Technologies India Private Limited, Bengaluru (IN)

( * ) Notice: Subject to any disclaimer, the term of this patent is extended or adjusted under 35 U.S.C. 154(b) by 0 days.

(21) Appl. No.: 18/439,471

(22) Filed: Feb. 12, 2024

(65) Prior Publication Data

US 2025/0024107 A1     Jan. 16, 2025

Related U.S. Application Data

(60) Provisional application No. 63/513,622, filed on Jul. 14, 2023.

(51) Int. Cl.
*H04N 21/478*     (2011.01)
*H04N 21/236*     (2011.01)
*H04N 21/4784*     (2011.01)

(52) U.S. Cl.
CPC ... *H04N 21/4784* (2013.01); *H04N 21/23614* (2013.01); *H04N 21/4781* (2013.01)

(58) Field of Classification Search
CPC ......... H04N 21/23614; H04N 21/4781; H04N 21/4784
See application file for complete search history.

(56) References Cited

U.S. PATENT DOCUMENTS 8,601,502 B2     12/2013 Higgins et al.
9,401,065 B2 *     7/2016 LeMay ............... G07F 17/3244
(Continued)

OTHER PUBLICATIONS

"How to Use Polls," Retrieved from https://help.twitch.tv/s/article/how-to-use-polls?language=en_US, Accessed on May 10, 2024, 6 pages.

(Continued)

*Primary Examiner* — Pinkal R Chokshi
(74) *Attorney, Agent, or Firm* — Kilpatrick Townsend & Stockton LLP

(57)     ABSTRACT

Systems, devices, and methods for providing content streaming and arcade game services are provided. An example method includes activating a streaming interface to be presented on a display connected to a user device, receiving streaming content of at least one content item from a service provider connected to the user device, outputting the received streaming content for presentation and playback in the streaming interface, activating an arcade interface and co-presenting the streaming interface and the arcade interface concurrently on the display, receiving gaming content of at least one cloud-hosted game from the service provider, and outputting the received gaming content for presentation and gameplay in the arcade interface.

18 Claims, 11 Drawing Sheets

(56) References Cited

U.S. PATENT DOCUMENTS

| | | | |
|---|---|---|---|
| 9,723,371 B2 | 8/2017 | Stephens | |
| 10,897,637 B1 | 1/2021 | Pham et al. | |
| 11,418,858 B2 | 8/2022 | Parampath et al. | |
| 11,599,896 B1 | 3/2023 | Craig | |
| 11,673,044 B1* | 6/2023 | Minton | G06Q 50/01 463/29 |
| 11,968,417 B2 | 4/2024 | Cosmo et al. | |
| 12,088,885 B2 | 9/2024 | Ditullio et al. | |
| 2007/0192782 A1* | 8/2007 | Ramaswamy | H04N 21/426 725/15 |
| 2010/0262993 A1* | 10/2010 | Mizuno | H04N 21/482 725/38 |
| 2011/0288912 A1 | 11/2011 | McCrea et al. | |
| 2011/0295667 A1 | 12/2011 | Butler | |
| 2012/0274863 A1* | 11/2012 | Chardon | G06F 16/65 348/734 |
| 2013/0044801 A1 | 2/2013 | Cote et al. | |
| 2013/0337917 A1* | 12/2013 | Baugus | A63F 13/92 463/43 |
| 2014/0253802 A1* | 9/2014 | Clift | H04N 21/4622 348/564 |
| 2014/0325549 A1 | 10/2014 | Sillerman | |
| 2016/0078465 A1 | 3/2016 | Chai et al. | |
| 2016/0234565 A1 | 8/2016 | Stephens | |
| 2017/0064359 A1 | 3/2017 | Houston et al. | |
| 2017/0139546 A1* | 5/2017 | Hartwell | H04N 21/458 |
| 2017/0366848 A1 | 12/2017 | Shaw et al. | |
| 2018/0124141 A1 | 5/2018 | Lewis et al. | |
| 2019/0075371 A1 | 3/2019 | Parampath et al. | |
| 2019/0075372 A1 | 3/2019 | Parampath et al. | |
| 2019/0082218 A1 | 3/2019 | Shaw et al. | |
| 2020/0066088 A1* | 2/2020 | Nelson | G07F 17/3211 |
| 2020/0304868 A1* | 9/2020 | Ganjam | H04N 21/4425 |
| 2021/0345006 A1 | 11/2021 | Stern et al. | |
| 2022/0167022 A1 | 5/2022 | Bettner et al. | |
| 2023/0046839 A1 | 2/2023 | Raleigh et al. | |
| 2023/0336836 A1* | 10/2023 | Phillips | A63F 13/355 |
| 2023/0370656 A1 | 11/2023 | Major | |
| 2024/0017179 A1 | 1/2024 | Dorn | |
| 2024/0155033 A1 | 5/2024 | Wei et al. | |
| 2024/0346928 A1* | 10/2024 | Hung | G01C 21/3815 |
| 2024/0408482 A1 | 12/2024 | Wu et al. | |

OTHER PUBLICATIONS

"Channel Points Guide for Viewers," Retrieved from https://help.twitch.tv/s/article/viewer-channel-point-guide?language=en_US, Accessed on May 10, 2024, 5 pages.

* cited by examiner

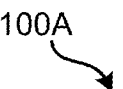
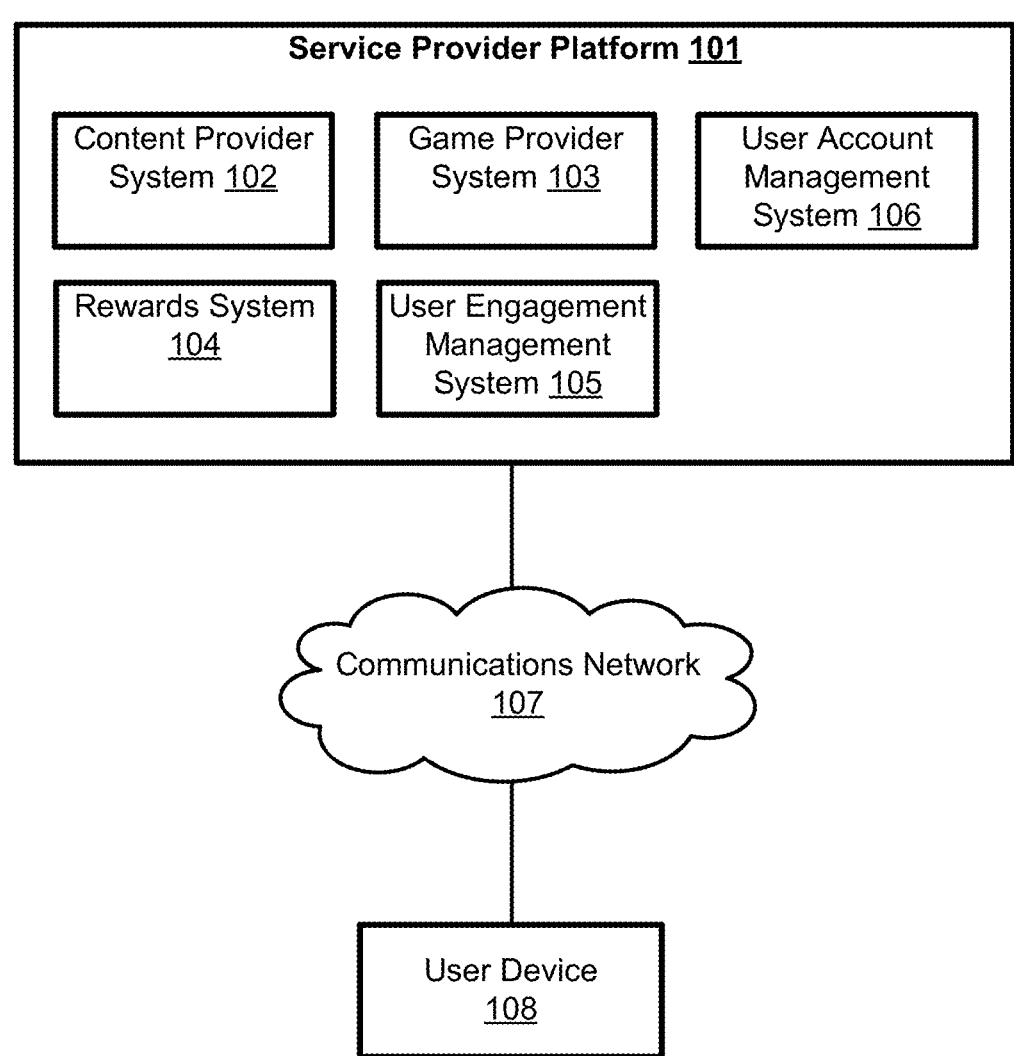
FIG. 1A

300A

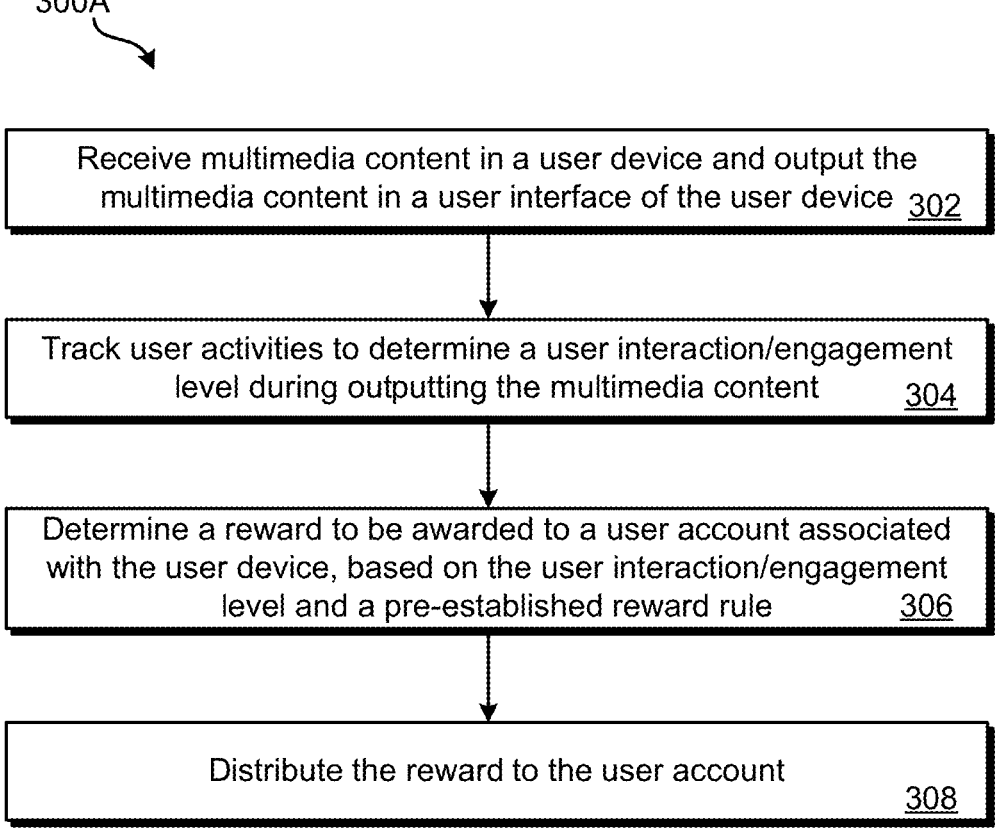

Receive multimedia content in a user device and output the multimedia content in a user interface of the user device  302

Track user activities to determine a user interaction/engagement level during outputting the multimedia content          304

Determine a reward to be awarded to a user account associated with the user device, based on the user interaction/engagement level and a pre-established reward rule          306

Distribute the reward to the user account          308

Execute a first application stored in a user device to stream content of a content item, the content being received from a content provider system and output to a display connected to the user device for a user to view     <u>322</u>

Automatically execute a second application stored in the user device to periodically generate a plurality of heartbeat messages at a frequency and transmit the heartbeat messages to the content provider system during the execution of the first application, each heartbeat message being timestamped and including a header and one or more playback states     <u>324</u>

Determine a total duration/amount of content of the content item that has been consumed during execution of the first application, based on the playback states of the plurality of heartbeat messages  <u>326</u>

Determine, for each content item, a reward to be awarded to a user account associated with the user device, based on the total duration/ amount of the consumed content of the content item and a pre-established reward rule     <u>328</u>

Aggregate the reward for each content item
<u>330</u>

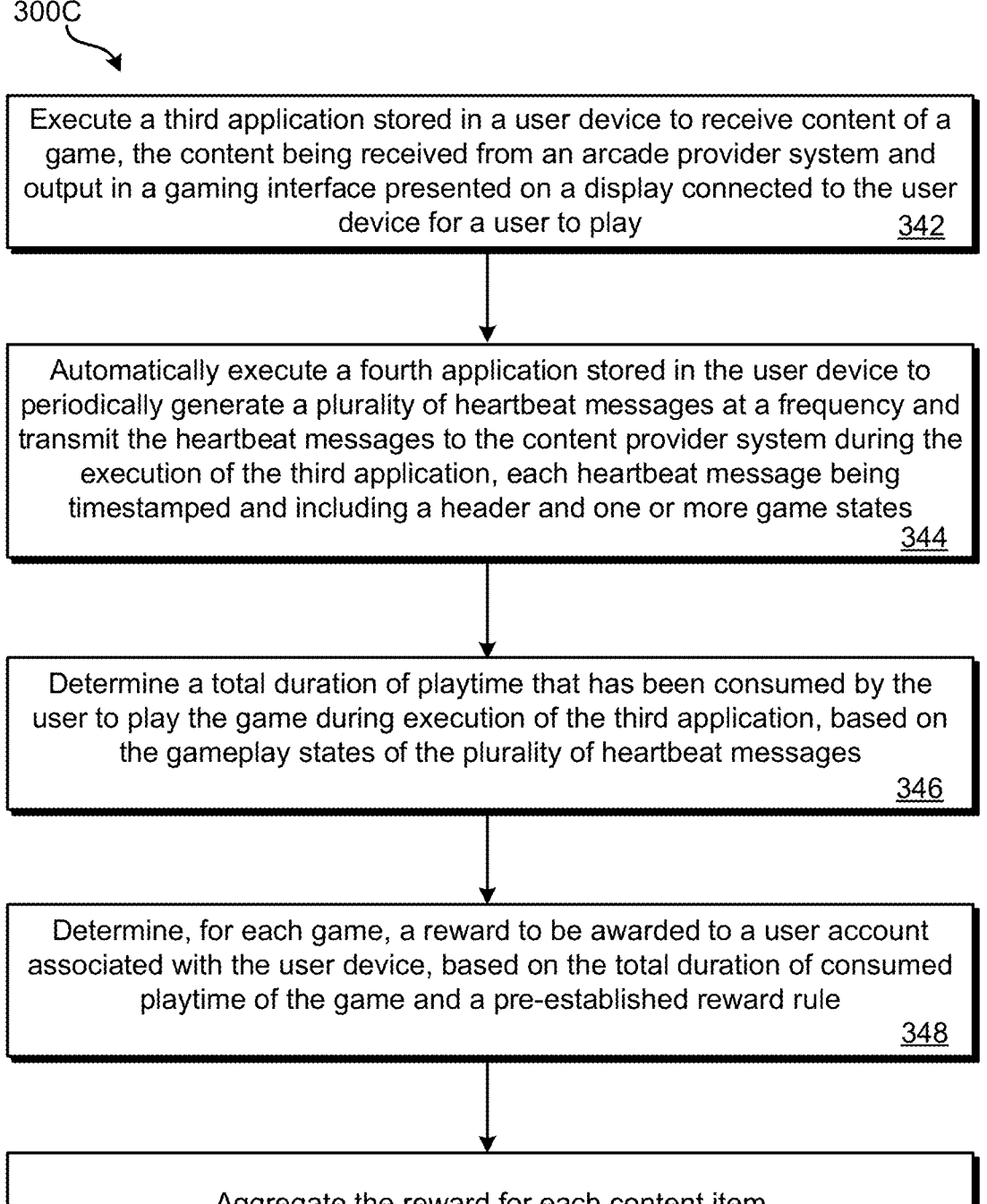

Execute a third application stored in a user device to receive content of a game, the content being received from an arcade provider system and output in a gaming interface presented on a display connected to the user device for a user to play     <u>342</u>

Automatically execute a fourth application stored in the user device to periodically generate a plurality of heartbeat messages at a frequency and transmit the heartbeat messages to the content provider system during the execution of the third application, each heartbeat message being timestamped and including a header and one or more game states <u>344</u>

Determine a total duration of playtime that has been consumed by the user to play the game during execution of the third application, based on the gameplay states of the plurality of heartbeat messages <u>346</u>

Determine, for each game, a reward to be awarded to a user account associated with the user device, based on the total duration of consumed playtime of the game and a pre-established reward rule <u>348</u>

Aggregate the reward for each content item     <u>350</u>

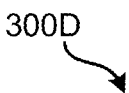

> Execute a first application stored in a user device to stream content of a content item, the content being received from a content provider system and output in a streaming interface connected to the user device for a user to view    362

> Execute a second application stored in a user device to receive content of a game, the content being received from an arcade provider system and output in a gaming interface presented on the display, wherein the streaming interface and the gaming interface are concurrently presenting on the display    364

> Automatically execute a third application stored in the user device to periodically generate a plurality of heartbeat messages at a frequency and transmit the heartbeat messages to the content provider system during the execution of the first application, each heartbeat message being timestamped and including a header, one or more playback states, and one or more gameplay states    366

> Determine a total duration of content of the content item that has been consumed during execution of the first application based on the playback states of the plurality of heartbeat messages, and determine a total duration of playtime that has been consumed by the user to play the game during execution of the second application, based on the gameplay states of the plurality of heartbeat messages    368

> Determine, for each content item, a first reward to be awarded to a user account associated with the user device, based on the total duration of the consumed content of the content item and a pre-established reward rule, and determine, for each game, a second reward to be awarded to the user account, based on the total duration of consumed playtime of the game and the pre-established reward rule    370

> Aggregate the first reward and the second reward and distribute the aggregated reward to the user account    372

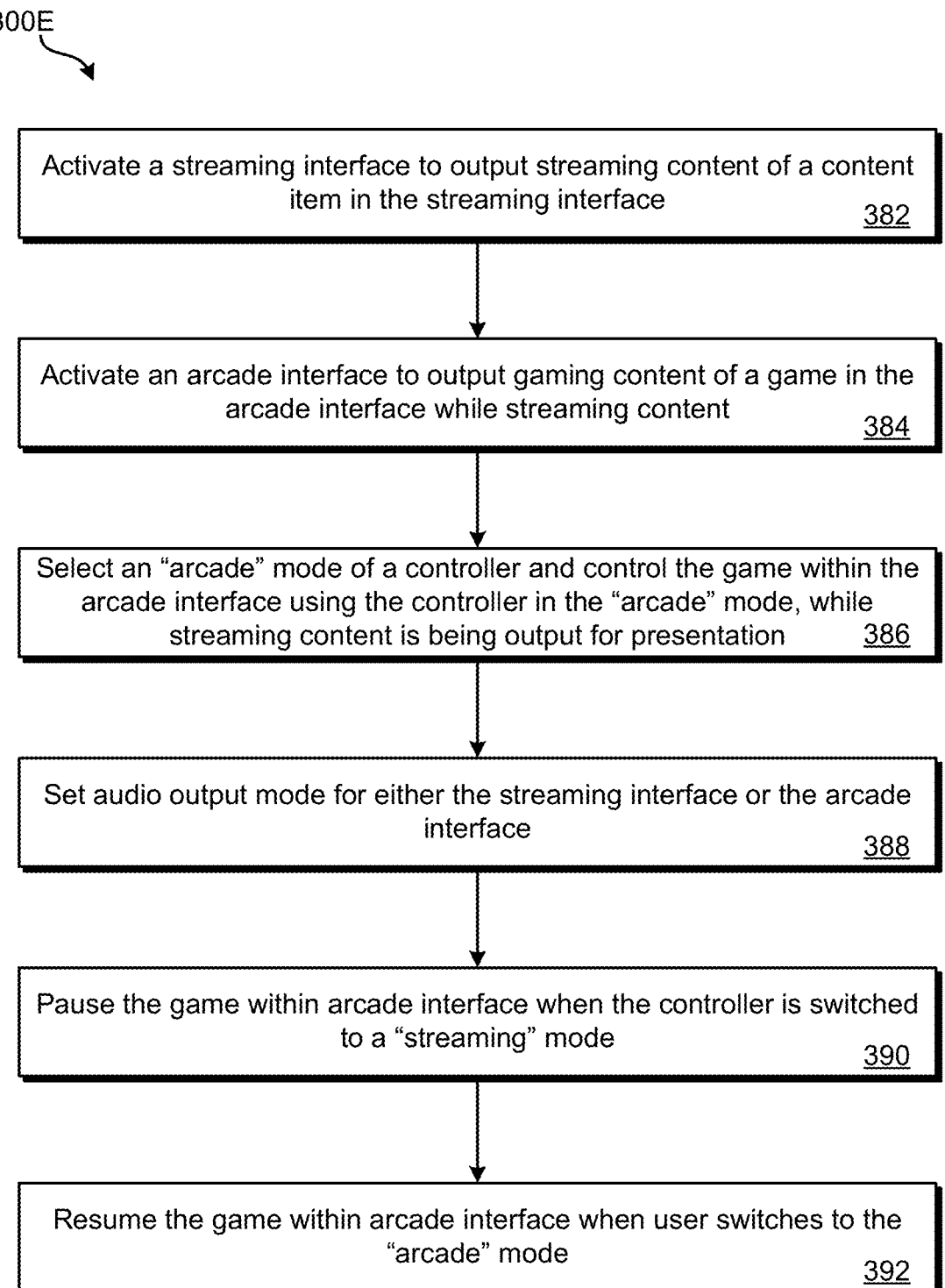

Activate a streaming interface to output streaming content of a content
item in the streaming interface                                    382

Activate an arcade interface to output gaming content of a game in the
arcade interface while streaming content                           384

Select an "arcade" mode of a controller and control the game within the
arcade interface using the controller in the "arcade" mode, while
streaming content is being output for presentation          386

Set audio output mode for either the streaming interface or the arcade
interface                                                          388

Pause the game within arcade interface when the controller is switched
to a "streaming" mode                                              390

Resume the game within arcade interface when user switches to the
"arcade" mode                                                      392

WORKING MEMORY

460

OPERATING SYSTEM

APPLICATION(S)

465

435

PROCESSOR(S) — 410

STORAGE DEVICE(S) — 425

INPUT DEVICE(S) — 415

OUTPUT DEVICE(S) — 420

COMMUNICATIONS SUBSYSTEMS — 430

METHOD AND SYSTEM FOR STREAMING WITH REWARDS TRACKING AND ARCADE CONTENT

CROSS REFERENCE TO RELATED APPLICATIONS

This application claims priority to U.S. Provisional Patent Application No. 63/513,622, filed on Jul. 14, 2023, the disclosure of which is incorporated by reference in its entirety for all purposes.

This application is related to U.S. Non-Provisional patent application Ser. No. 18/439,551, filed Feb. 12, 2024, now U.S. Pat. No. 12,587,708, issued Mar. 24, 2026, titled "METHOD AND SYSTEM FOR STREAMING WITH REWARDS TRACKING," the disclosure of which is incorporated by reference in its entirety for all purposes.

BACKGROUND

In contemporary digital environments, providing users with diverse and immersive experiences and promoting user engagement has become a key focus for many digital platforms, such as multimedia content providers, game providers, streaming service providers, and others. A reward system is typically used to award a user account based on the engagement and activity of users with these digital platforms. Traditionally, reward systems often rely on static criteria, such as the completion of predefined tasks or the accumulation of fixed points. However, these approaches may fall short in adapting to the dynamic and varied nature of user interactions within modern digital ecosystems. In addition, traditional reward systems may not fully capitalize on the potential to incentivize users across different forms of user engagement.

SUMMARY

In accordance with some embodiments of the present disclosure, a method is provided. The method may be computer-implemented. In one example, a method includes: activating, by a user device in response to a first user input requesting for streaming, a streaming interface and presenting the streaming interface on a display connected to the user device. The method further includes receiving, by the user device, streaming content of at least one content item from a service provider, outputting, by the user device, the received streaming content for presentation and playback in the streaming interface, activating an arcade interface of the user device, in response to a second user input requesting for gameplay, and concurrently co-presenting the streaming interface and the arcade interface on the display. The method further includes receiving, by the user device, gaming content of at least one cloud-hosted game from the service provider, and outputting, by the user device, the received gaming content for presentation and gameplay in the arcade interface.

In some embodiments, the method further includes generating, periodically by an application being executed on the user device, a plurality of status messages. Each status message is timestamped and includes: a header containing information about the at least one content item, one or more playback states regarding the output of the streaming content, and one or more gameplay states regarding user interaction with the game. The method further includes transmitting the plurality of status messages to the service provider, and determining, by the service provider, a total duration of output content and a total duration of gameplay time, based on the plurality of status messages.

In accordance with some embodiments of the present disclosure, a user device is provided. In one example, the user device includes: one or more processors and a computer-readable storage media storing computer-executable instructions. The computer-executable instructions, when executed by the one or more processors, cause the user device to activate a streaming interface in response to a first user input, and the streaming interface is presented on a display connected to the user device. The computer-executable instructions, when executed by the one or more processors, further cause the user device to receive streaming content of at least one content item from the service provider, output the received streaming content for presentation and playback in the streaming interface, activate an arcade interface on the user device, in response to a second user input requesting for gameplay, and the streaming interface and the arcade interface are concurrently co-presented on the display. The computer-executable instructions, when executed by the one or more processors, further cause the user device to receive gaming content of at least one cloud-hosted game from the service provider, and output the received gaming content for presentation and gameplay in the arcade interface.

In some embodiments, the computer-executable instructions, when executed by the one or more processors, further cause the user device to generate periodically a plurality of status messages. Each status message is timestamped and includes: a header containing information about the at least one content item, one or more playback states regarding the output of the streaming content, and one or more gameplay states regarding user interaction with the game. The computer-executable instructions, when executed by the one or more processors, further cause the user device to transmit the plurality of status messages to the service provider, and receive a notification indicating a total duration of output content and a total duration of gameplay time. The total duration of output content and the total duration of gameplay time are determined by the service provider, based on the plurality of status messages.

In accordance with some embodiments of the present disclosure, a system is provided. In one example, the system includes: a user device and a user engagement tracking device in communication with the user device. The user device is configured to activate a streaming interface in response to a first user input, present the streaming interface on a display connected to the user device, receive streaming content of at least one content item from the service provider, output the received streaming content for presentation and playback in the streaming interface, and activate an arcade interface on the user device, in response to a second user input requesting for gameplay. The streaming interface and the arcade interface are concurrently co-presented on the display. The user device is further configured to receive gaming content of at least one cloud-hosted game from the service provider, and output the received gaming content for presentation and gameplay in the arcade interface.

In some embodiments, the user device is further configured to generate periodically a plurality of status messages. Each status message is timestamped and includes: a header containing information about the at least one content item, one or more playback states regarding the output of the streaming content, and one or more gameplay states regarding user interaction with the game. The user device is further configured to transmit the plurality of status messages to the service provider. The service provider is configured to determine a total duration of output content and a total duration of gameplay time, based on the plurality of status messages, and send a notification indicating the total duration of output content and the total duration of gameplay time to the user device.

In accordance with some embodiments, the present disclosure also provides a non-transitory machine-readable storage medium encoded with instructions, the instructions executable to cause one or more electronic processors of a computer system or computer device, such as a user device or a user engagement tracking device to perform any one of the methods or any operations thereof described in the present disclosure.

BRIEF DESCRIPTION OF THE DRAWINGS

FIG. 1A is a block diagram illustrating an example communications system for providing services and rewards to users, according to various embodiments of the present disclosure.

FIG. 3A is a flow diagram illustrating an example method for tracking user activities in a streaming environment, according to various embodiments of the present disclosure.

FIG. 3B is a flow diagram illustrating an example method for tracking rewards related to content streaming in a streaming environment, using status/heartbeat messages of the present disclosure.

FIG. 3C is a flow diagram illustrating an example method for tracking rewards related to gaming in a gaming environment, using status/heartbeat messages, according to various embodiments of the present disclosure.

FIG. 3D is a flow diagram illustrating an example method for tracking rewards related to both content streaming and gaming in a streaming and gaming environment, using status/heartbeat messages, according to various embodiments of the present disclosure.

FIG. 3E is a flow diagram illustrating an example method for controlling an arcade game while streaming content is being output concurrently, according to various embodiments.

DETAILED DESCRIPTION

Figure 1B:
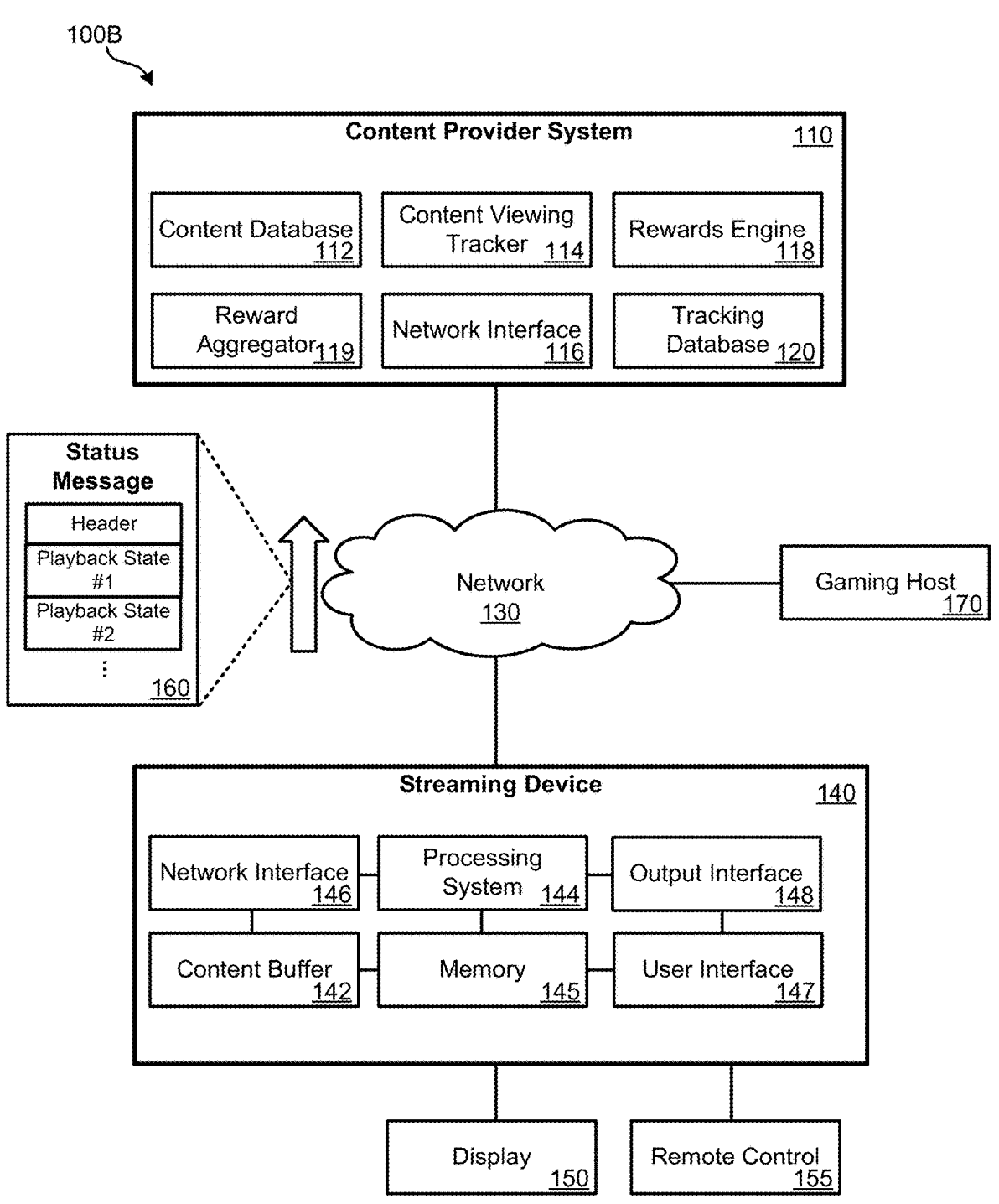
FIG. 1B is a block diagram illustrating an example streaming system in which rewards are tracked using status/heartbeat messages, according to various embodiments of the present disclosure.

The present disclosure provides systems, devices, and methods generally related to providing media services, and more particularly, to tracking user interaction and engagement with the media services, tracking the earning of rewards based on the user engagement, and providing the rewards users.

One insight provided in the present disclosure is related to using status/heartbeat messages in a content streaming environment to more accurately track the content that has been output and actually consumed by the user. According to some embodiments, status/heartbeat messages may be periodically generated while the streaming content is being output, and each status/heartbeat message may include one or more playback states indicating the user engagement with the output streaming content. A total duration of the content that has been actually output and consumed by the user may be determined by analysis of the status/heartbeat messages based on the playback states indicated in the status/heartbeat messages, and a reward can be determined based on a pre-established reward rule that specifies the correlation between the total duration of the output/consumed content and the reward.

Another insight provided in the present disclosure is related to using status/heartbeat messages in an arcade or gaming environment to more accurately track the playtime actually consumed by the user to play or interact with the game. According to some embodiments, status/heartbeat messages may be periodically generated while the gaming content is being output, and each status/heartbeat message may include one or more gameplay states accurately indicating the user engagement with the game. A total duration of the playtime the user actually consumed may be determined by analysis of the status/heartbeat messages based on the gameplay states indicated by the status/heartbeat message, and a reward can be determined based on a pre-established reward rule that specifies the correlation between the total duration of the consumed playtime and the reward.

A further insight provided in the present disclosure is related to a dual-mode user interface having both a content streaming interface and an arcade interface concurrently presenting on a single display for the user to interact with. Steaming content and the gaming content can be concurrently output and co-presented in the streaming interface and the arcade interface, respectively. This allows the user to view the streaming content while playing the game within the arcade interface, which may enhance the user experience and engagement. Additionally, a single set of periodic status/heartbeat messages can be used to track both the total duration of output consumed content and the total duration of consumed playtime to more accurately structure the reward for the user.

FIG. 1A is a block diagram illustrating an example communications system 100A for providing services and rewards to users. In the illustrated example, communications system 100A includes, among other components, service provider platform 101, communications network 107, and user device 108. In some embodiments, service provider platform 101 further includes content provider system 102, game provider system 103, rewards system 104, user engagement management system 105, and user account management system 106. Each component included in the communications system 100 may be a hardware piece, a software piece, or a combination of hardware and software. Additional or fewer components may be included in the communications system 100A and/or the service provider platform 101.

In some embodiments, service provider platform 101 is an online digital platform capable of providing various digital services to the user device 108 via the communications network 107 as well as managing the user account associated with the user of user device 108. The digital services may include multimedia content delivery and streaming services as well as gaming services. In some embodiments, content provider system 102 is responsible for providing multimedia content delivery services to user device 108, and game provider system 103 is responsible for providing game services to user device 108.

The communications network 107 communicatively couples the user device 108 with the service provider platform 101. The communications network 107 may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G/6G or other cellular network, Internet of Things (IoT) networks, cloud based networks, private networks, public networks, or otherwise.

The rewards system 104 is responsible for determining, tracking, and distributing rewards earned by the users to their respective user accounts. Rewards used herein generally refer to incentives or benefits offered to users based on their interactions, engagement, or achievements on the service provider platform 101. Rewards may take any possible forms. For example, users may earn points or credits for each activity or interaction on the service provider platform 101, such as watching content, playing games, or completing specific tasks. Accumulated points can be redeemed for various benefits. Depending on pre-established rules, users may also use rewards to receive discounts or exclusive coupons for services provided by the platform, premium content, or in-app purchases, based on their level of engagement or specific achievements. In some embodiments, the reward system 104 may be integrated into the content provider system 102, or the game provider system 103, or both.

The user engagement management system 105 is responsible for managing, monitoring, and tracking the user activities, user interaction, and user engagement with the services provided by service provider platform 101. In some embodiments, the user engagement management system 105 employs various approaches to gauge the extend of user involvement and determine a level of user engagement with the service provider platform 101. For example, the user engagement management system 105 may track content items or a total amount of contents actually viewed by the user and determine a level of user engagement with the content provider over a predetermined period of time, based on the viewership. For another example, the user engagement management system 105 may track the number of games played by the user, victories achieved, and/or an overall duration of time for which the user actually played the game, over a predetermined period of time. The user engagement management system 105 may further generate user engagement data which can be used by the rewards system 104 to determine the reward to be distributed and allocated to the user, based on preestablished reward rules.

The user account management system 106 is responsible for managing the user accounts and the rewards allocated to the user accounts within the service provider platform 101. The user account management system 106 is further responsible for the creation, authentication, and general management of user accounts. Additionally, the user account management system 106 may manage the rewards distributed to user accounts and facilitate allocation based on user engagement tracked by the user engagement management system 105 and the predetermined reward rules.

Figure 1C:
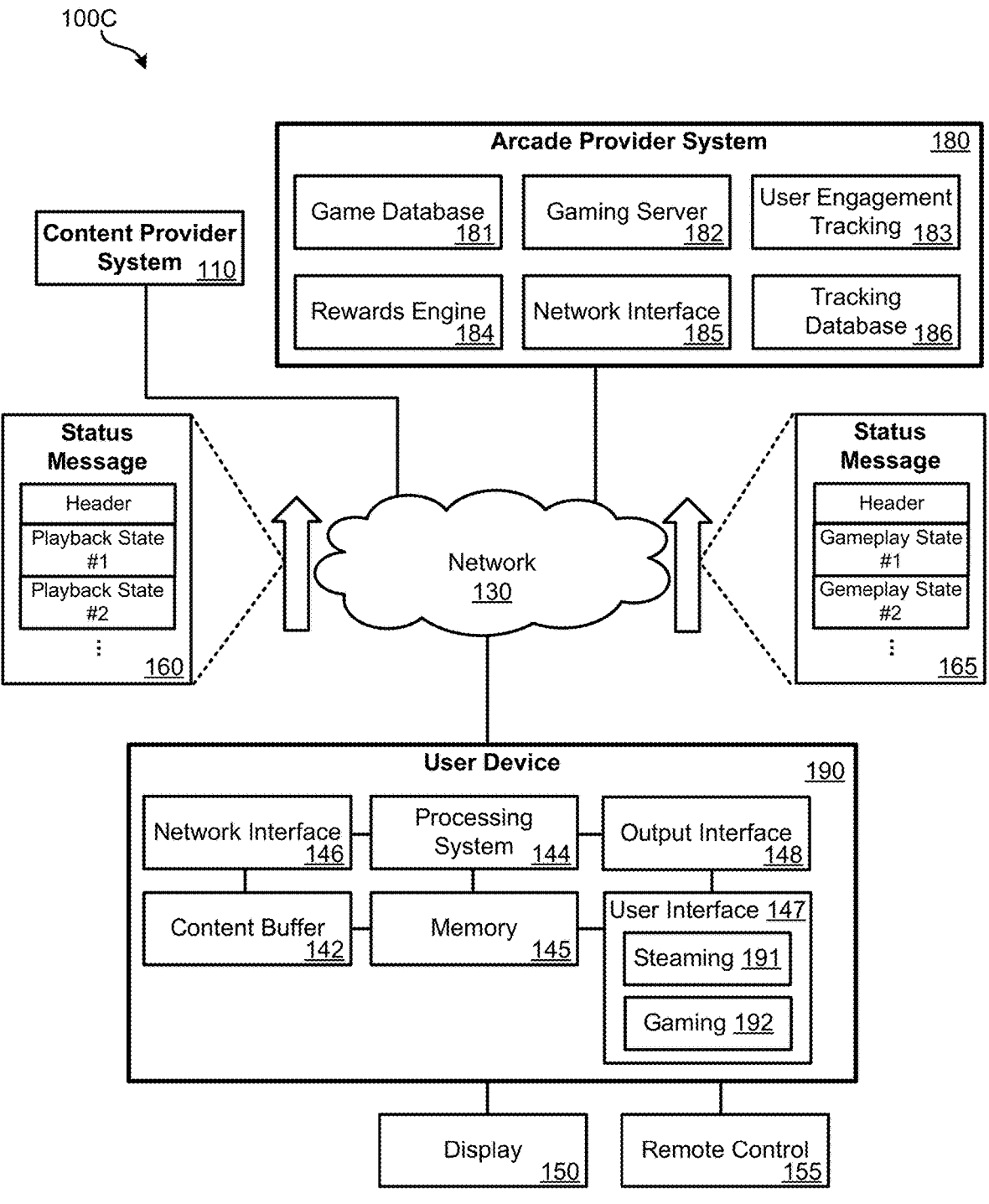
FIG. 1C is a block diagram illustrating an example communications system in which rewards are tracked using status/heartbeat messages, according to various embodiments of the present disclosure.

FIGS. 1B-1C illustrate additional communications systems 100B-100C, which are variations of communications system 100A of FIG. 1A. FIG. 1B illustrates an example of a streaming system 100B in which rewards are tracked using status/heartbeat messages. Streaming system 100B can include: content provider system 110; network 130; streaming device 140; display device 150; remote control 155; and optionally a game host. Content provider system 110 may be an example of content provider system 102 in FIG. 1A, network 130 is an example of the communications network 107 of FIG. 1A, and streaming device 140 is an example of the user device 108 of FIG. 1A. The game host 170 may be an example of the game provider system 103 of FIG. 1A of a component included therein.

Content provider system 110 can include, among other components, content database 112, content viewing tracker 114, network interface 116, rewards engine 118 (or rewards device 118), reward aggregator 119, and tracking database 120. It should be noted that content provider system 110 of FIG. 1B is an example of an integrated system that integrates the content provider system 102, the rewards system 104, and the user engagement management system 105 of FIG. 1A. The content database 112 is configured to store multimedia content items such as video and/or audio contents. The multimedia content can be retrieved from the content database 112 for streaming to various streaming devices, such as streaming device 140. Network interface 116 is configured to facilitate communication between content provider system 110 with network 130, which can include the Internet and, possibly, various other public and/or private networks through which communication with streaming devices can be performed. The multimedia content can be streamed and received by stream device 140. Content viewing tracker 114 is an example of the user engagement management system 105 and configured to track the duration of content actually output and viewed in association with user accounts.

Streaming device 140 may be a computerized device that is connected with a display device 150 (e.g., a television), such as via output interface 148 being connected with an input HDMI port, that allows content output by streaming device 140 to be presented by the display device 150 connected to the streaming device. In such embodiments, remote control 155 may allow a user to provide input to streaming device 140 wirelessly. Alternatively, streaming device 140 may be a computerized device that directly outputs streaming content, such as a tablet computer or laptop computer.

In some embodiments, the streaming device 140 further includes a content buffer 142, a processing system 144, a memory 145, a network interface 146, a user interface 147, and an output interface 148. In some embodiments, the output interface is integrated into the user interface 147. The content buffer 142 is a storage component configured to temporarily store streaming content and hold a portion of the content in advance to allow for smoother playback by compensating for variations under circumstances. The processing system 144 may include one or more central processing units (CPUs) configured to perform various computational tasks, including decoding compressed content, managing streaming protocols, handling user interface interactions, and executing various applications stored in the memory 145. The memory 145 may include both volatile (RAM) and non-volatile (storage) memory components configured to store data and instructions that the processing system 144 requires for immediate access. The network interface 146 is configured to connect the streaming device 140 to the network 130 and facilitate communication with the content provider system 110 to allow the streaming device 140 to request and receive streaming content.

The user interface 147 may serve as the means through which users interact with and control the steaming device 140. The user interface 147 may further include various input engines for the users to navigate content, search content, control playback, set preferences, etc. The user interface 147 may be integrated with various streaming applications. The output interface 148 is responsible for delivering the audio and video content from the streaming device 140 to the display device 150. The output interface may serve as the connection point through which the streaming device 140 interfaces with the display device 150.

In some embodiments, the user interface 147 includes at least one of a content streaming interface (hereinafter "streaming interface"), a gaming interface (e.g., an arcade interface), or both. The streaming interface may be a first graphical user interface (GUI) or interaction design that allows users to navigate, brose, view, search, and access streaming content such as movies, TV shows, and music on a streaming device 140. The gaming interface may be a second GUI designed for gaming interactions. In some embodiments, the user interface 147 is a dual-mode or multi-mode interface that is switchable between content streaming and gaming. In some embodiments, the user interface 147 has a split-screen or dual-interface design to allow the users to simultaneously access, view, and interact with both the content streaming and gaming interfaces on the same display.

The remote control 155 may be a handheld input device capable of facilitating user interaction with the streaming device 140. In some embodiments, the remote control 155 may include a directional pad or thumbsticks for intuitive menu navigation and in-game movement. The remote control 155 may include various action buttons to serve dual functions and allow users to play, pause, or navigate through content streaming interfaces as well as execute in-game actions during gaming sessions. Furthermore, a mode-switching feature on the controller enables users to seamlessly transition between content streaming and gaming modes (interfaces).

Based upon such factors as the duration or amount of content viewed in association with the particular user account, the user account may be eligible for one or more rewards. Rewards may be doled out to user accounts based on a total duration of content viewed or the user account may be randomly eligible for a reward due to the account having been used to view content. Rewards engine 118 is an example of the rewards system 104 of FIG. 1A or a component included therein and may receive data or information from content viewing tracker 114 and/or retrieve information from tracking database 120 to determine whether a reward should be awarded to a particular user account and/or a quantity of reward to be distributed to the user account, based on pre-established reward rules. Indications of the rewards may be stored to tracking database 120, which may also be used to store information about the amount of content the viewed in association with the user account. In some situations, a user account can be linked with multiple user devices which are permitted to stream content concurrently, so it is possible that over a defined period of time, the amount of rewards earned is multiples of the duration of time that has actually elapsed.

As mentioned above, the type of reward provided may be a credit that can be used toward services available via content provider system 110 for which an account owner would otherwise need to provide payment. For example, a particular piece of content may typically cost some monetary amount to stream. A reward provided via rewards engine 118 may permit the user to stream such content for free or for a reduced price. As another alternative, rewards may permit a user account to access a streaming channel (e.g., television channel that is available for streaming) for free for a period of time or at a reduced cost. In other embodiments, rewards may be redeemed for access to a gaming interface (e.g., an arcade interface) or particular games within the gaming interface. As yet another embodiment, rewards may be redeemable for merchandise or hardware available through the content provider that manages content provider system 110.

A key aspect to providing a user account with an award is being able to accurately track the amount of content actually viewed in association with the user account and/or the duration of time for which streaming content is being viewed in association with the user account. While content provider system 110 may be able to determine on its end whether streaming content is being transmitted to a streaming device that is linked with the particular user account, this output by content provider system 110 does not necessarily correspond to the streaming content being output by the streaming device nor to the streaming content actually viewed by the user using the streaming device.

Regardless of the form in which streaming device 140 takes, streaming device 140 may use the processing system 144 to execute a particular application ("app") associated with content provider system 110. This application may be required to be executed in order to log in via a user account, access, and stream content from content provider system 110. Despite this application being required to be used in order to access and stream content from content provider system 110, the content provider may have little control over how streaming device 140 shuts down the application when the user no longer desires content to be streamed. For example, if a user provides an exit command to streaming device 140 signaling the users desire to exit the application, streaming device 140 may abruptly end the process associated with the application. No indication that the application has been closed or that streaming content has been stopped being output may be provided by streaming device 140 to content provider system 110. Therefore, for a time, content provider system 110 may continue transmitting streaming content to streaming device 140.

Additionally, some amount of the streaming content may be temporarily stored by streaming device 140 in content buffer 142 before being output. The amount of content stored to content buffer 142 may vary based on the connection speed between streaming device 140 and content provider system 110 and also based on the output resolution of the content. If the user provides an exit command or the application is otherwise terminated, streaming device 140 may discard content stored to content buffer 142 without having output such content for presentation. Therefore, for accuracy, it may be important to not credit the user account with having viewed such content, such as for the purposes of rewards.

Rather than relying on the amount or duration of content streamed by content provider system 110 to track the viewing of content, such as for providing viewing rewards, the application executed by processing system 144 may cause the streaming device 140 to periodically or occasionally generate status/heartbeat messages and transmit the status/ heartbeat messages back to content provider system 110 via network 130. The content provider system 110 may determine the amount or duration of content that were actually output to the display device and viewed by the user, based on the information provided in the status/heartbeat messages.

The terms "status message," "update message," "check message," "heartbeat message," "status update message," and other terms alike as interchangeably used here, in the context of content streaming and interaction with user devices, refers to a recurring and periodic signal sent from the user device to the service provider platform. The status/ heartbeat message serves as a communication mechanism to indicate the continued presence and operational status of the user device. The status/heartbeat message may contain essential information about the user device's state, such as its identifier, connectivity status, operational status, playback status, streaming status, gameplay status, a status of a particular application executed on the user device, and other possibly relevant metrics. The periodic transmission of status/heartbeat messages allows the service provider platform to monitor and track the user's activity and engagement with the service provider platform through the user device. In the context of tracking user engagement with content streaming or gaming interfaces, status/heartbeat messages may also include information about the user's current activities, playback states, gameplay states, or other interaction patterns related to user engagement with the service provider platform.

In tracking and determining the reward for content streaming and viewing, since a heartbeat message requires that the application be executed in order to be created and transmitted, the information contained within the heartbeat message can be expected to be much more accurate than viewership data calculated exclusively by content provider system 110, for example, by the amount of content that has been transmitted from the content provider system 110 to the streaming device 140. An example of heartbeat message 160 is illustrated in FIG. 1B. Heartbeat message 160 can include: a header; and entries for one or more playback states. The header can indicate a unique identifier, details of the device being used for playback, and user details, such as an indication of a particular user profile active for a particular user account. The heartbeat message can include one or more playback states. Each playback state can indicate: a particular playback state (e.g., media plays, media paused, media buffering, play rate, stream resolution, output streaming rate, buffer rate, etc.), a duration of time in this particular state, a genre type (or asset type of an indication of a particular franchise, such as the movie franchise "Star Wars"); whether the content is an advertisement. Therefore, a heartbeat message may be transmitted less often since the message can relay details about multiple states which have occurred since the previous heartbeat message. As an example, the heartbeat could indicate that playback occurred for 27 seconds and the content was paused for 4 seconds.

The amount of time that content is indicated as being played back on the streaming device 140 may indicate a duration of time of the piece of streaming content that has been output, via output interface 148, for presentation either directly via streaming device 140 or an external device, such as display device 150. The playback length indicated in a playback state in the heartbeat message may exclude time during which a trick play mode was being used on streaming device 140, such as rewinding or fast forwarding. As an example, a heartbeat message may be transmitted periodically, such as once per 5 seconds or once per minute.

In some embodiments, the heartbeat message 160 may include a playback state that precisely indicates the current playback rate. This playback rate allows for the specification of the current rate at which the content is being consumed, whether it is at the normal playback rate (e.g., 1×), an accelerated rate (e.g., 2× or 3×), or any other playback rate selected by the user. The heartbeat message 160 may include additional information regarding the amount of content being output during accelerated playback, and a discounting mechanism may be applied to accurately reflect the actual amount of content streamed as if it were played under the normal playback rate. For instance, if the content is being played at an accelerated rate (e.g., 2× or 3×), the discounting mechanism adjusts the metrics to reflect the equivalent duration as if it were played at the normal or standard playback rate (e.g., 1×). This adjustment compensates for the increased speed and enables precise calculations of the user's engagement to ensure that the metrics align with the actual time spent on content consumption. Such discounting mechanism allows to adjust the content duration and user engagement in accordance with the chosen playback rate and provide a precise representation of the time spent by the user in consuming content at varying rates. The inclusion of such playback rate details in the heartbeat message 160 may contribute to a more granular and accurate assessment of user activity on viewing contents and user engagement with the streaming interface.

In some embodiments, a playback state can indicate a buffer length value. The buffer length value may be used to specify either the size of content buffer 142 or the duration of content currently stored to content buffer 142. The buffer length value may be used by content viewing tracker 114 to ensure that the user account is not credited with the output of content that has been buffered, but not yet output. As an example of how such data could be used, the buffer length value may be used instead of the playback length value. Using the buffer length value, content viewing tracker 114 can more accurately determine the duration of content that has actually been output for presentation by streaming device 140 via output interface 148. For example, when a piece of content ends, the duration of content stored to content buffer 142 can reach zero, since there is no portion of the content left to be output. In such a situation, heartbeat message 160 could indicate to content provider system 110 that the duration of content stored to content buffer 142 has reached zero or simply the corresponding playback state may not be included.

Based upon the information contained within heartbeat message 160 and subsequent heartbeat messages, content viewing tracker 114 may more accurately store information on the duration of content output in association with the user account, which can in turn allow rewards engine 118 to more accurately provide awards to user accounts at block 240. While rewards are an example, there are many other reasons why viewing via a user account may need to be accurately tracked, such as for monitoring the popularity of particular streaming content.

In some embodiments, the content viewing tracker 114 may generate an output or report indicating the total duration of output content and send a notification message that includes the output or report to the streaming device 140.

Multiple devices can be used to output streaming content in conjunction with a single account. For example, multiple members of a family may be permitted to access streaming content via a common account or linked accounts. Heartbeat-based tracking may be performed for all of these devices with points or value resulting from such tracking being aggregated such that a particular user or account can redeem the aggregated rewards. As an example, a component of content provider system 110, such as reward aggregator 119, can be used to combine rewards accumulated across linked accounts such that the aggregated rewards can be redeemed only once and/or by a particular account. It also may be possible that multiple devices are streaming content concurrently in association with a common account or linked accounts. This situation can result in rewards being accumulated at a higher rate (e.g., twice as fast, three times as fast) compared to a single stream being output for presentation.

Streaming device 140 may also be in communication with gaming host 170. Gaming host 170 may be an example of the game provider system 103 of FIG. 1A of a component thereof. Gaming host 170 may be accessible via the cloud and may be operated independently from content provider system 100. Through application executed by processing system 144, streaming device 140 may be directed to access, via network interface 146, gaming host 170 to access particular gaming functions via an arcade interface. In some embodiments, the gaming host 170 is an arcade provider system 180 or a component thereof (e.g., gaming server 182), which will be described with reference to FIG. 1C.

FIG. 1C illustrates another example of a communications system 100C, which is a variation of the communications system 100B. In the illustrated example, the communications system 100C includes content provider system 110, arcade provider system 180, network 130, and user device 190. Components similar to the communications system 100B as described above will not be repeated herein unless otherwise indicated.

The arcade provider system 180 is an example of the game provider system 103 of FIG. 1A. The arcade provider system 180 is responsible for delivering gaming content to user device 190, tracking user interaction and engagement with the arcade games provided by the arcade provider system 180, and determining and allocating rewards to user account associated with the user. In some embodiments, the arcade provider system 180 further includes, among others, a gaming database 181, a gaming server 182, a user engagement tracking engine 183 (or user engagement tracking device 183), a rewards engine 184, a network interface 185, and a tracking database 186.

The game database 181 stores arcade games and related information such as arcade game titles, descriptions, genres, ratings, and any other relevant metadata. Examples of arcade games include but are not limited to Tetris, Dr. Mario, Columns, Crossy Road, Frogger, Endless Ducker, Dino Jump, etc. The video and audio content or content segments related to the arcade games can be retrieved by the gaming server from the game database 181 and delivered to the user device 190 for the user to play or interact with. The gaming server 182 is responsible for hosting and facilitating single-player or multi-player gaming experiences. The gaming server 182 can manage and coordinate various aspects of single-player or multi-player games, allow multiple user devices to connect and interact, and enable multiple users to compete each other in real-time.

The user engagement tracking engine 183 is responsible for monitoring and tracking user activities and determining a level of user engagement with the arcade games output to the display. For example, the user activities may be indicated by a total duration of time for which the user actually played the arcade game, including the time spent navigating through menus, participating in gameplay, and interacting with in-game elements. The user engagement tracking engine 183 may also keep track of the total number of arcade games the user has successfully completed, monitor and record the total number of arcade games the user has won, track specific achievements or challenges completed by the user during gameplay, capture scoring data, and so on. The user engagement tracking engine 183 may generate user engagement data indicating a quantitative level of user engagement, which may be used for determining the amount of reward to be distributed to the user account associated with the user. The user engagement data may include various quantitative metrics reflecting the user's engagement with arcade games, including total playtime, the number of games completed, the number of victories, achievements unlocked, and other relevant gameplay statistics. The user engagement tracking engine 183 can assign numerical values or scores to different aspects of user engagement to create a quantitative representation of the user's interaction with the arcade games. The user engagement data may be stored in the tracking database 186.

The rewards engine 184 is responsible for determining the quantity of rewards based on the user interaction data generated by the user engagement tracking engine 183. The rewards engine 184 may utilize the quantified user engagement data and apply pre-established reward rules to determine the amount of reward to be distributed to the user. The reward determination process may take into account the metrics of the user engagement data including user's total duration of playtime, total number of games played, total number of achievements, total number of victories, and other relevant factors. The rewards engine 184 may further make final reward calculations based on pre-established reward rules and distribute the calculate reward to the user account.

The user device 190 is a variation of the streaming device 140 of FIG. 1A and include similar components described above. The user device 190 may include an application stored in memory 145 executable by processing system 144 to cause the streaming device 140 to periodically or occasionally generate heartbeat messages 165 and transmit the heartbeat messages 165 back to arcade provider system 180 via network 130. The arcade provider system 180 may determine the total duration of playtime for which the user actually played the game and other attributes for reward determination, based on the information provided in the heartbeat messages 165.

An example of heartbeat message 165 is illustrated in FIG. 1C. Heartbeat message 165 can include: a header; and entries for one or more gameplay states. Similar to the heartbeat message 160 for tracking the content actually viewed by the user, the header of the heartbeat message 165 may include, among others, unique identifier for the heartbeat message 165, user device information (e.g., user device ID), user details (e.g., user profile or user account ID), timestamp indicating when the heartbeat message was generated. The entries section includes one or more entries, each representing a specific gameplay state. The entries may convey real-time information about the user's interactions with the arcade game. For example, gameplay states may include media play state indicating the start of gameplay, when the gameplay is paused, a media buffering state indicating buffering events during gameplay, gameplay rate state specifying the current gameplay rate (normal rate, 2×, 3×), playing mode indicating the current gameplay mode (e.g., single-player, multiplayer), progress state indicating the user's progress within the arcade game, scoring of the arcade game, outcome of the arcade game, and so on.

In some embodiments, the heartbeat message 165 may include a gameplay state that precisely indicates a current controller state of a controller (e.g., the remote control 155), indicating whether the controller is active or in use. For example, when the user is operating the controller to play an arcade game, input events (e.g., user input signals) are generated by the user device 190 and transmitted to the gaming server 182. The input events may include signals indicating button presses, button movements, joystick movements, or other actions performed using the controller. The status of the controller may be recorded as a gameplay state included in the heartbeat message 165. By including the dedicated "controller in use" state in the heartbeat message 165, a more clear and accurate indication of when the user is actively engaged with the arcade game can be obtained. The "controller in use" state adds an additional layer of specificity to the overall gameplay tracking and enables the user engagement tracking engine 183 to precisely track the user's interaction with the arcade game.

In some embodiments, the user interface 147 of the user device 190 are bi-mode and can include a streaming interface 191 and an arcade interface 192, which can be switchable and/or simultaneously presented on the display device 150 in a split-screen manner or other suitable manners. User may have the option to switch between the streaming interface and the gaming interface, for example, by toggling between the two modes using the remote control 155. In some embodiments, the remote control 155 may have input functionalities to support both the streaming interface and the gaming interface. The remote control 155 may have dedicated controls or modes tailored for gaming interactions, such as buttons, joysticks, or triggers optimized for gaming scenarios. Simultaneously, the remote control 155 can switch or adapt to a different set of controls or modes suitable for navigating and interacting with streaming content. In the gaming mode, the remote control 155 provides the necessary inputs and controls for playing arcade games. In the streaming mode, the remote control 155 provides controls optimized for navigating streaming interfaces, such as menu navigation, selecting content, adjusting volume, and other streaming-related actions. Users may have the ability to manually switch between gaming and streaming modes on the controller, depending on their current activity.

In some embodiments, when both the streaming interface 191 and the arcade interface 192 are presented on the display device 152, both heartbeat message 160 and heartbeat message 165 may be used to respectively track the duration of streaming content and the duration of gameplay time. Using separate heartbeat messages allows for a comprehensive and detailed tracking of the duration of streaming content and gameplay time independently. In some embodiments, each one of the heartbeat messages 160 and 165 may further indicate a controller mode state indicating the whether the controller is in "streaming" mode or "gaming" mode. A combination of "controller in use" and "gaming mode" included in the heartbeat message 165 indicates that that the user is actually playing the arcade game.

In some embodiments, the set heartbeat messages 160 and the set of heartbeat messages 165 can be consolidated into one single set of heartbeat messages, and each of the consolidated heartbeat message may include a header, one or more playback states, and one or more gameplay states. The single set of heartbeat messages can be used to track the user engagement with both the streaming content and the game. The information from the single set of heartbeat messages can be used to more accurately determine the reward for the user account in association with the user device.

Figure 2A:
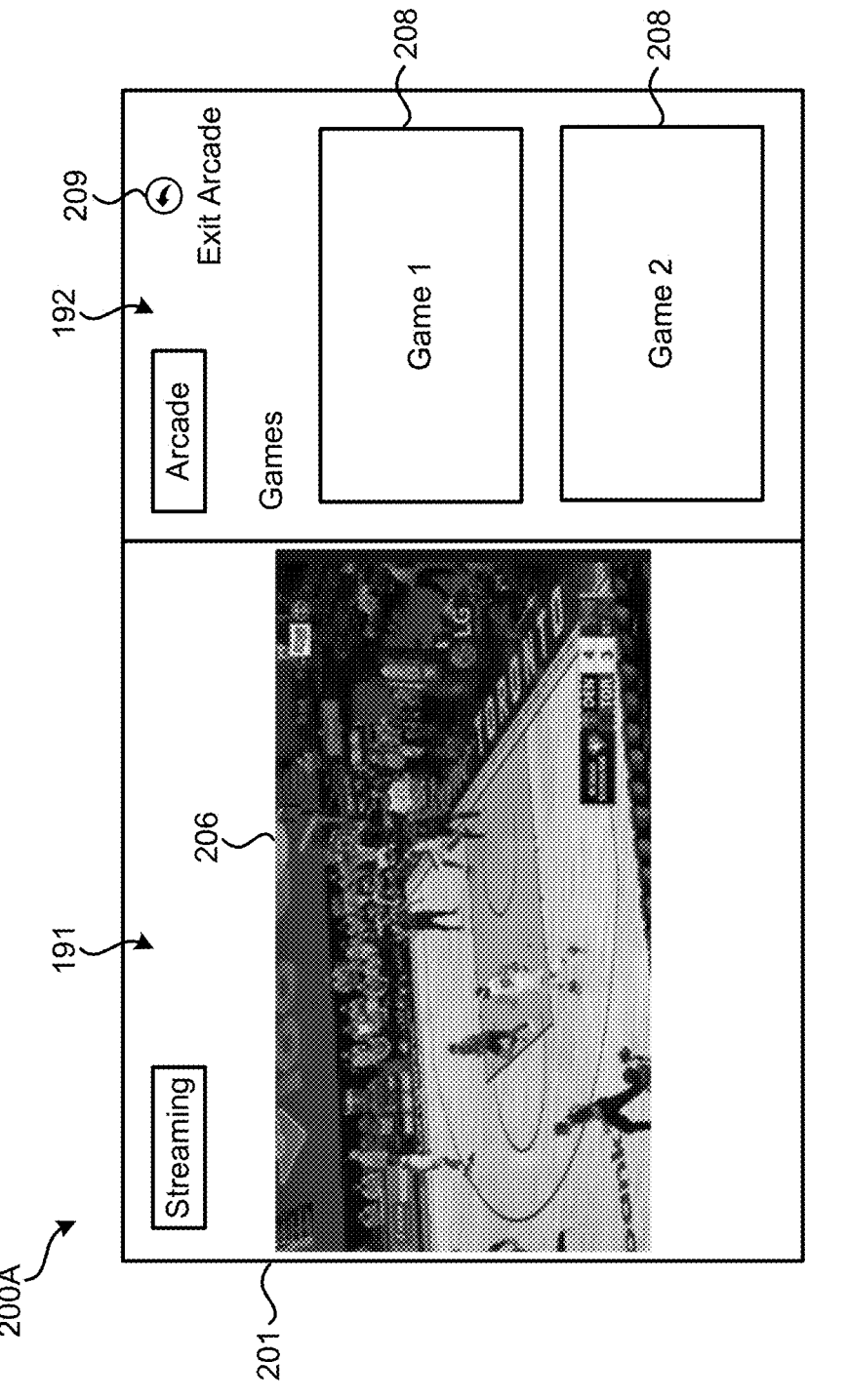
FIG. 2A illustrates an example screenshot of a user interface having both a streaming interface and an arcade interface concurrently co-presenting on a display, according to various embodiments of the present disclosure.

FIG. 2A illustrates an example screenshot of a user interface 200A displayed on a display area 201 of the display device 150. In the illustrated example, the user interface 200A is a dual-mode interface that includes a streaming interface 191 and an arcade interface 192 concurrently co-presenting on the display device 150 in a split-screen mode. The streaming content is output and presented in the streaming interface 191, the gaming content is output and presented in the arcade interface 192, concurrently with outputting the streaming content in the streaming interface 191. As illustrated, a television may be acting as the user device 190 or in communication with user device 190. Alternatively, a similar dual-mode interface may be presented via another form of streaming device, such as a tablet computer or gaming device.

A user, while streaming content is being output by a streaming device, may activate the arcade interface 192. In order to activate the arcade interface, the user may make a selection via an on-screen menu. Alternatively, on remote control 155 of user device 190, a dedicated button may be present that allows selection of an arcade mode and activation of the arcade interface 192. When activated, entering the arcade interface 192 may perform a "squeezeback." A squeezeback results in streaming content being resized to occupy only a portion of the display area 201, thus allowing arcade interface 192 to be simultaneously co-present along with streaming content 206 being received from content provider system 110.

By default, when arcade interface 192 is activated, a portion of the user input device, such as remote control 155, may be used to navigate within arcade interface 192. As an example, a directional pad ("d-pad") of the remote control 155 may be used for navigation within arcade interface 192, such as for interacting with the game or selecting a game 208 within arcade interface 192. D-pad input to user device 190 may not allow for exiting from arcade interface 192 (during gameplay, a user may be pressing the d-pad repeatedly and quickly, so an accidental input that exits gameplay may be desired to be avoided). Notably, the content for arcade interface 192 may be provided from a separate cloud-based source than streaming content 206. Therefore, while the executing application presents them concurrently, the application and underlying user device 190 may access the content of the game 208 and streaming content 206 from separate sources.

While navigating through arcade interface 192, the directional pad of the remote control 155 may be assigned to operate within only arcade interface 192, and a user may be required to press a dedicated exit button on the remote control 155 to in order to return to interaction with the streaming interface 191 and control of content streaming, such as what content is being streamed. A user may actuate a virtual button 209 to exit the arcade interface and return to the streaming interface 191. A user may select an arcade game and play the game, such as using the directional pad. In some embodiments, control may be more nuanced. For example, pressing a dedicated exit button for less than a duration of time on remote control 155 may not stop the game 208 currently being played but keep game 208 active; holding the dedicated exit button for more than the duration of time on remote control 155 can result in the game being paused, as detailed below, and allowing the user to interact with the streaming content 206 within the streaming interface.

When a user exits controlling game 208, such as by pressing an exit button on the remote control 155, the game 208 may be paused, which can include streaming device 140 transmitting a pause command to gaming host 170. When a user re-selects arcade interface 192, gameplay may automatically be resumed, such as a command being transmitted to gaming host 170 to resume gaming, or a subsequent user input may be required to unpause the game.

Figure 2B:
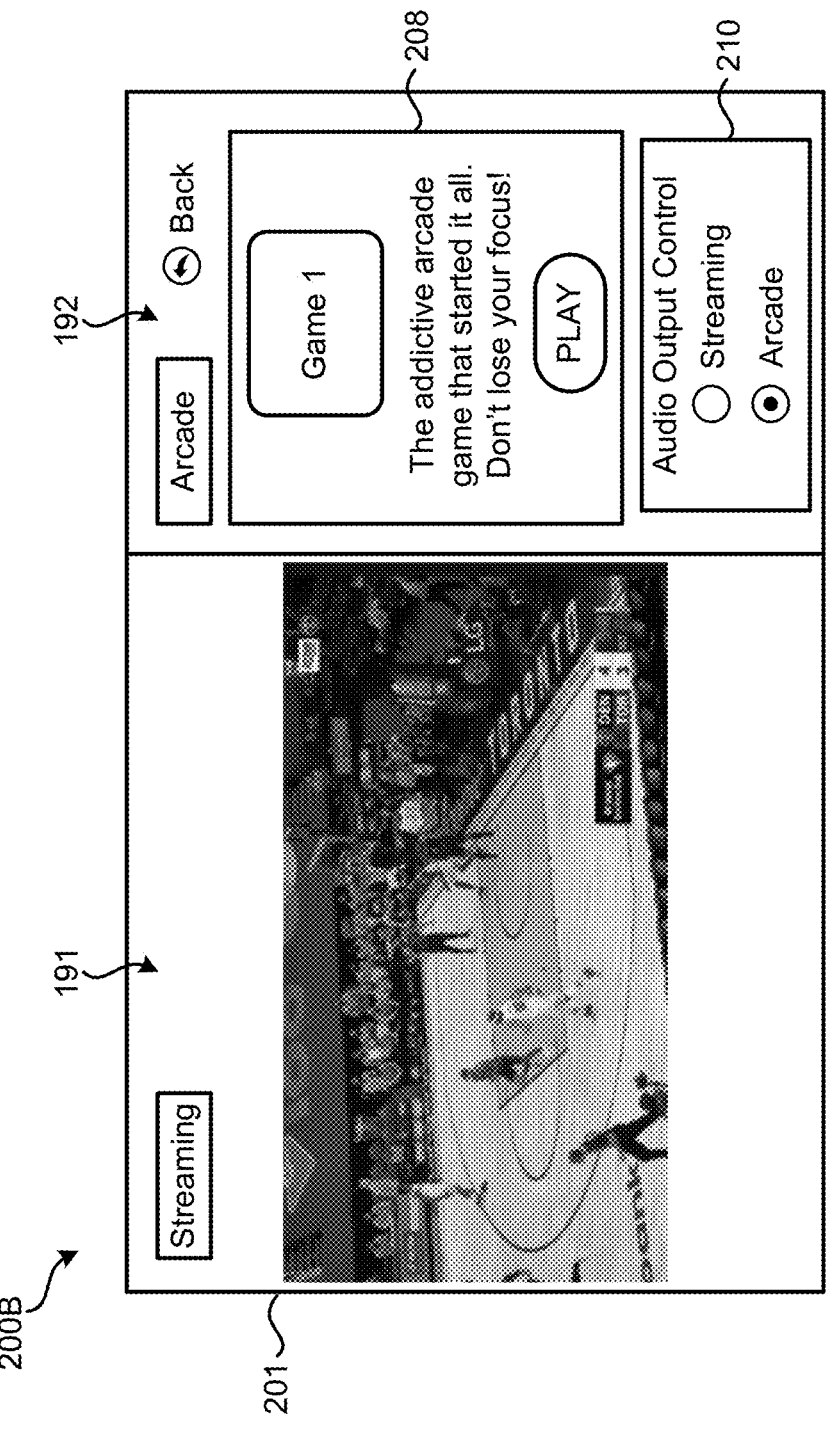
FIG. 2B illustrates another example screenshot of a user interface having both a streaming interface and an arcade interface concurrently co-presenting on a display, according to various embodiments of the present disclosure.

FIG. 2B illustrates another example screen shot of a user interface 200B displayed on a display area 201 of the display device 150. In the illustrated example, the user interface 200B is a dual-mode interface that includes a streaming interface 191 and an arcade interface 192 concurrently co-presenting on the display device 150 in a split-screen mode. The arcade interface 192 further includes a virtual panel 210 for audio output control. The virtual panel 210 provides options for the user to control audio output and specify whether the audio output via user device 190 is audio associated with streaming content 206 (through streaming interface 191) or game 208 (through arcade interface 192). The virtual panel 210 can provide more options for the user to control audio output, such as adjusting audio settings (volume, mute, audio source selection, etc.).

FIG. 3A is a flow diagram illustrating an example method 300A for tracking rewards. Method 300A may include one or more operations/steps. Few or additional operations/steps may be included. The operations of method 300A may be combined with operations of another method described herein in any suitable manner.

At 302, media content or multimedia content is transmitted from a service provider platform and received in a user device connected to the service provider platform via a communications network. The multimedia content may include streaming content, which is transmitted from a content provider system. The multimedia content may include game content, which is transmitted from a game provider system. One or more applications stored in the user device may be executed to receive, process, buffer, stream, play, and output the multimedia content. In some embodiments, the multimedia content is presented in a user interface on a display connected to the user device for the user to view and interact with the multimedia content.

At 304, user activities are tracked by the service provider platform to determine a user interaction level or a user engagement level. User activities may include a total duration or amount of content that has been output to the display and actually viewed/consumed by the user and a total duration of time for which the user actually played a game. In some embodiments, periodic or occasional heartbeat messages are used to track the user activities and user engagement level, as described below with references to FIGS. 3B-3D.

At 306, reward is determined by the service provider platform, based on the user interaction/engagement level and a pre-established reward rule. In some embodiments, the user interaction/engagement level is mapped to the reward, according to the pre-established reward rule. At 308, the reward is distributed/allocated to a user account associated with the user device.

FIG. 3B is a flow diagram illustrating another example method 300B for tracking rewards related to content streaming on a user device and consumption by a user, using heartbeat messages. Like method 300A, method 300B may include one or more operations/steps. Few or additional operations/steps may be included. The operations of method 300B may be combined with operations of another method described herein in any suitable manner.

At 322, a first application (e.g., streaming application) stored in a memory of a user device is executed to receive, process, buffer, stream, streaming content transmitted from a content provider system and received in the user device in communication with the content provider system via a communications network. The streaming content is buffered and then output for streaming, through a user interface, to a display connected to the user device.

At 324, a second application (e.g., tracking application) stored in the user device is automatically executed to cause the user device to periodically or occasionally generate a plurality of first heartbeat messages at a frequency and transmit the plurality of first heartbeat messages to the service provider system, upon initiation of the execution of the first application and during the execution of the first application. In some embodiments, the second application is automatically triggered and executed upon receiving the streaming content. Each one of the first heartbeat messages is timestamped and includes information indicating one or more playback states about the received streaming content that is being output for presentation. In some embodiments, the frequency is from once per one second to once per one minute. Other frequencies are also possible within the scope of the present disclosure.

In some embodiments, the first application and second application are the same application. For example, the first application may be a first unit of an application, and the second application may be a second unit of the same application. A unit within an application, as used herein, refers to a self-contained and modular component that is responsible for performing specific functionalities, tasks, or features. Each unit may be configured to operate as an independent component and to interact/collaborate with other units within the same application. In some embodiments, the application may include a first unit and a second unit. The first unit of the application is executable to receive, process, buffer, stream, and output streaming content transmitted from the content provider system. The second unit of the application is executable to cause the user device to periodically or occasionally generate a plurality of first heartbeat messages, during the execution of the first unit or during the execution of the application.

In some embodiments, each first heartbeat message includes a header and one or more playback states. The header includes information about the content item, the user device, and the user account. The one or more playback states include a first playback state indicating a current output streaming rate (e.g., bps), a second playback state indicating a duration of time in the current output streaming rate, and a third playback state indicating a current play rate (e.g., paused (play rate is zero), 1×, 2×, 3×). In some embodiments, the duration of time in the current play rate is the time interval calculated based on the frequency of the first heartbeat messages. For example, if the frequency of first heartbeat messages is once per 10 seconds, the time interval is 10 seconds.

The first heartbeat message may include additional playback states indicating other information related to user activities, user engagement with the streaming content, and user interaction with the user interface presenting the streaming content. For example, a playback state may indicate a current stream resolution. Higher resolutions (e.g., High Definition (HD), Ultra High Definition (UHD)) may result in larger file sizes for videos or images, and streaming higher resolution content may require more data to be transferred over the network to the user device and output to the display and thus may require a higher stream rate. Users may choose lower resolutions for faster streaming or opt for higher resolutions for enhanced visual fidelity. Accordingly, the resolution state may be a factor in calculating the total duration of consumed content.

The first heartbeat message may also include a playback state indicating a buffer state and a buffer rate may indicate a current stream resolution. Higher resolutions (e.g., High Definition (HD), Ultra High Definition (UHD)) may result in larger file sizes for videos or images, and streaming higher resolution content may require more data to be transferred over the network to the user device and output to the display and thus may require a higher stream rate. Users may choose lower resolutions for faster streaming or opt for higher resolutions for enhanced visual fidelity. Accordingly, the resolution state may be a factor in calculating the total duration of consumed content.

In some embodiments, the first heartbeat message further includes a playback state indicating a controller state of a controller (e.g., the remote control 155) operated by the user. The controller state may indicate whether the controller is "in use" or "idle" and provide a direct insight into the user's physical interaction with the output content. In some embodiments, when both a streaming interface and a gaming interface are activated and concurrently presenting on the display, the first heartbeat message may further include a playback state indicating whether the controller is in a "streaming mode" or a "gaming mode," as described below.

At 326, a total duration of content of the content item that has been output and consumed by the user during execution of the first application (i.e., a total duration of consumed content) is determined, by the content service provider, based on the plurality of first heartbeat messages received in the content service provider. In some embodiments, a report is generated (e.g., by the content viewing track) to include the information about the total duration of output content, and the report is sent to and received by the user device.

In some embodiments, the first heartbeat messages are processed and analyzed to calculate the total duration of consumed content, based on a preestablished model. In some embodiments, the total duration of consumed content is calculated by aggregating the segment duration (hereinafter "segment") of consumed content for each time interval of the plurality of first heartbeat messages. The segment of consumed content for each time interval can be calculated by multiplying the output streaming rate indicated by the preceding first heartbeat message and the duration of time interval. The total duration of consumed content may be the aggregation of the segment of consumed content for each time interval during a given period of time (e.g., when the player application is being executed). As noted above, the output streaming rate is zero when the playback state is "paused," regardless of the amount of content being streamed in the buffer stage before being output to the display. In some embodiments, the total duration of consumed content excludes the amount of content being buffered but not yet output to the display nor presented in the user interface.

In some embodiments, a discounting mechanism may be applied to adjust the segment of content for a time interval based on the play rate indicated in a heartbeat message preceding the time interval. For example, a heartbeat message includes a playback state indicating that the current play rate is 3× (accelerated playing), the segment of output content for the time interval after the heartbeat message and before the next heartbeat message will be discounted by the play rate (e.g., the discounted duration is ⅓ of the calculated duration). The discounting mechanism allows the total duration of content consumption to accurately reflect the actual viewing time by taking into account variations in play rates. This approach contributes to precise tracking of user engagement and content consumption across different playback scenarios.

In some embodiments, the heartbeat message may further include playback states indicating whether the user is fast forwarding the content streaming. The playback state related to fast forwarding is identified within the information provided by the heartbeat messages. The playback state parameters associated with fast forwarding may include indicators such as "fast forward engaged" or a specific play rate indicating fast forward mode. The timestamp of the heartbeat message is recorded to establish the time when the user enters the fast-forwarding state. During the time interval between the current heartbeat message and the next one, the segment of output content may be adjusted based on the fast-forwarding state. If the user is fast forwarding, a similar discounting mechanism may be applied on the calculated duration to accurately represent the actual content viewed during fast forward.

In some embodiments, the heartbeat message may further include playback states indicating a current progress state (i.e., a playback position) of the content item. This information can be used to assess the practicality of the increase in content progress over a specific time interval. For example, a current heartbeat message may indicate a current playback position of the content item is 10%, and a preceding heartbeat message may indicate a playback position of 3%. A determination can be made on whether the increase from 3% to 10% in the time interval is practical within the time interval. If the increase is determined to be impractical or exceed expected rates of content progression, it indicates that the user may have entered a fast-forwarding mode during that time interval. This indication may be used to flag the time interval as a potential fast-forwarding scenario. During time intervals flagged as potential fast forwarding, a discounting mechanism may be applied to adjust the duration of output content. The duration is discounted to accurately represent the actual content viewed by considering the potential fast-forwarding activity.

It should be noted that the specific embodiments for tracking user engagement and calculating the total duration of consumed content as described herein are for illustrative purposes only, and other approaches may also be possible within the scope of the present disclosure.

At 328, a reward to be awarded to a user account associated with the user device is determined, for each content item, based on the total duration/amount of consumed content and a pre-established reward rule. The reward rule may specify a mapping correlation between the amount of reward and the amount of consumed content for each content item. At 330, when multiple content items are delivered to the user device and consumed by the user, the reward for each content item may be aggregated. In some embodiments, if the content has been output to multiple user devices associated with the user account and consumed by multiple users, respectively, the reward for each user may be aggregated for the common user account.

FIG. 3C is a flow diagram illustrating another example method 300C for tracking rewards related to gaming on a user device and game playing by a user, using heartbeat messages. Like method 300B, method 300C may include one or more operations/steps. Few or additional operations/steps may be included. The operations of method 300C may be combined with operations of another method described herein in any suitable manner.

At 342, a third application (e.g., arcade application) stored in a memory of a user device is executed to receive, process, buffer, stream, streaming content of a game transmitted from a game host and received in the user device in communication with the game host via a communications network. The content is output through a gaming interface, to a display connected to the user device for the user to play or interact with.

At 344, a fourth application (e.g., tracking application) stored in the user device is automatically executed to cause the user device to periodically generate a plurality of second heartbeat messages at a frequency and transmit the plurality of second heartbeat messages to the service provider system, upon initiation of the execution of the first application. In some embodiments, the fourth application is automatically triggered and executed upon receiving the content of the game. Each one of the second heartbeat messages is time-stamped and includes information indicating one or more gameplay states about the received gaming content that is being output for presentation. In some embodiments, the frequency is from once per one second to once per one minute. Other frequencies are also possible within the scope of the present disclosure.

In some embodiments, the third application and fourth application are the same application, in a similar manner as first application and the second application. For example, the third application may be a third unit of an application, and the fourth application may be a fourth unit of the same application. The third unit of the application is executable to receive, process, buffer, stream, streaming content of a game transmitted from a game host. The fourth unit of the application is executable to cause the user device to periodically or occasionally generate a plurality of second heartbeat messages, during the execution of the first unit or during the execution of the application.

In some embodiments, the first, second, third, and fourth applications may be the same application. For example, the first, second, third, and fourth applications may be correspondingly the first, second, third, and fourth units within the same application excitable on the user device.

In some embodiments, each second heartbeat message includes a header and one or more gameplay states. The header includes information about the game, the user device, and the user account. The one or more gameplay states include a first gameplay state indicating a current state of a controller (e.g., a remote control) operated by the user as being active (e.g., in use) or idle (e.g., not in use), optionally a second gameplay state indicating a current mode of the controller as being a "streaming" mode or a "gaming" mode (e.g., an "arcade" mode), and a third gameplay state indicating a duration of time in the current state of the controller. In some embodiments, the duration of time in the current play rate is the time interval calculated based on the frequency of the second heartbeat messages. For example, if the frequency of second heartbeat messages is once per 10 seconds, the time interval is 10 seconds. The second heartbeat message may include additional playback states indicating other information related to user activities, user engagement with the game, and user interaction with the gaming interface presenting the game.

At 346, a total duration of playtime consumed by the user to play the game during execution of the third application (i.e., a total duration of consumed playtime) is determined, by the game host or a user engagement tracking device/engine of the game host, based on the plurality of second heartbeat messages received in the game host. In some embodiments, the second heartbeat messages are processed and analyzed to calculate the total duration of consumed playtime, based on a preestablished model. In some embodiments, the total duration of consumed playtime is calculated by aggregating the segment of consumed playtime for each time interval of the plurality of second heartbeat messages. The segment of consumed playtime for each time interval can be determined by counting the duration of the time interval with a preceding heartbeat message indicating a controller state as "in use" and in a "gaming" mode. As noted above, the time intervals having a preceding second heartbeat message indicating an inactive controller state or not in a "gaming" mode may be excluded from the calculation of the total duration of playtime. It should be noted that the example approach for calculating the total duration of consumed playtime as described herein is for illustrative purposes only, and other approaches may also be possible within the scope of the present disclosure.

At 348, a reward to be awarded to a user account associated with the user device is determined, for each game, based on the total duration of consumed playtime and a pre-established reward rule. The reward rule may specify a mapping correlation between the amount of reward and the amount of consumed playtime for each game. At 330, when multiple content items are delivered to the user device and consumed by the user, the reward for each game be aggregated.

FIG. 3D is a flow diagram illustrating another example method 300D for tracking rewards, using heartbeat messages. Method 300D may include one or more operations/steps. Few or additional operations/steps may be included. The operations of method 300D may be combined with operations of another method described herein in any suitable manner.

At 362, a user interface is activated on a user device. The user interface includes a streaming interface and an arcade interface concurrently presented on a display of the user device. In some embodiments, a first application (e.g., a media streaming application) is executed to receive, process, buffer, stream, streaming content of a content item transmitted from a content provider system and received in the user device in communication with the content provider system via a communications network. The streaming content is buffered and then output for streaming, in a streaming interface, on a display connected to the user device.

At 364, a second application (e.g., an arcade application) stored in the memory of the user device is executed to receive, process, buffer, stream, streaming content of a game transmitted from an arcade provider system and received in the user device in communication with the arcade provider system via a communications network. The gaming content is output through a gaming interface, to a display connected to the user device for the user to play or interact with. The first and second application are concurrently executed, and the streaming content and the gaming content are concurrently output and presenting on the display.

At 366, a third application (e.g., user interaction tracking application) stored in the user device to periodically generate a plurality of heartbeat messages at a frequency and transmit the heartbeat messages to the content provider system and the arcade provider system during the execution of the first application. Each heartbeat message is time-stamped and includes a header, one or more playback states, and one or more gameplay states.

The header includes information about the content item, the game (if the gaming content of the game is output in the arcade interface), the user device, and the user account. The one or more playback states include a first playback state indicating a current output streaming rate (e.g., bps), a second playback state indicating a duration of time in the current output streaming rate, and a third playback state indicating a current play rate (e.g., paused (play rate is zero), 1×, 2×, 3×). In some embodiments, the duration of time in the current play rate is the time interval calculated based on the frequency of the first heartbeat messages. The one or more gameplay states include a first gameplay state indicating a current state of a controller (e.g., a remote control) operated by the user as being active (e.g., in use) or idle (e.g., not in use), optionally a second gameplay state indicating a current mode of the controller as being a "streaming" mode or a "gaming" mode, and a third gameplay state indicating a duration of time in the current state of the controller. In some embodiments, the duration of time in the current play rate is the same as the duration of time in the current gameplay state, which is the time interval calculated based on the frequency of the heartbeat messages.

At 368, a total duration of consumed content and a total duration of consumed playtime by the user during execution of the first application are determined, respectively, based on the playback states and gameplay states of the plurality of heartbeat messages.

At 370, a first determination and a second determination are made. The first determination is made, for each content item output in the streaming interface, on a first reward to be awarded to a user account associated with the user device, based on the total duration of the consumed content of the content item and a pre-established reward rule. The second determination is made, for each game output in the arcade interface, on a second reward to be awarded to the user account, based on the total duration of the consumed playtime and the pre-established reward rule. At 380, the first reward and the second reward are aggregated and distributed to the user account.

FIG. 3E is a flow diagram illustrating an example method 300E for playing an arcade game while streaming content is being output concurrently. Method 300E may include one or more operations/steps. Few or additional operations/steps may be included. The operations of method 300E may be combined with operations of another method described herein in any suitable manner.

At 382, a streaming interface of a user device is activated, upon a first user request or execution of a first application stored in the user device, to receive streaming content of a content item transmitted from a content provider system and output the streaming content in a streaming interface on a display connected to a user device.

At 384, an arcade interface is activated, upon a second user request or execution of a second application stored in the user device, to receive gaming content of an arcade game selected by the user and transmitted from an arcade provider system. The gaming content is output in the arcade interface on the display, concurrently with the outputting of the streaming content in the streaming interface. The streaming interface and the gaming interface are co-presenting concurrently on the display.

At 386, a user input selecting an "arcade" mode of a controller connected to the user device is received in the user device, and one or more input events to control the game within the arcade interface are received from the controller in the "arcade" mode, while the streaming content is being output in the streaming interface for presentation.

At 388, a user input indicating a selection of an audio output for either the streaming interface or the gaming interface is received in the user device, and audio output is selected by the user device based on the user input.

At 390, the game is paused upon receiving a user input switching to a "streaming mode" of the controller, while the streaming content is being output in the streaming interface for presentation.

At 392, the game is resumed within the arcade interface upon receiving a user input switching back to the "arcade" mode, while the streaming content is being output in the streaming interface for presentation.

Figure 4:
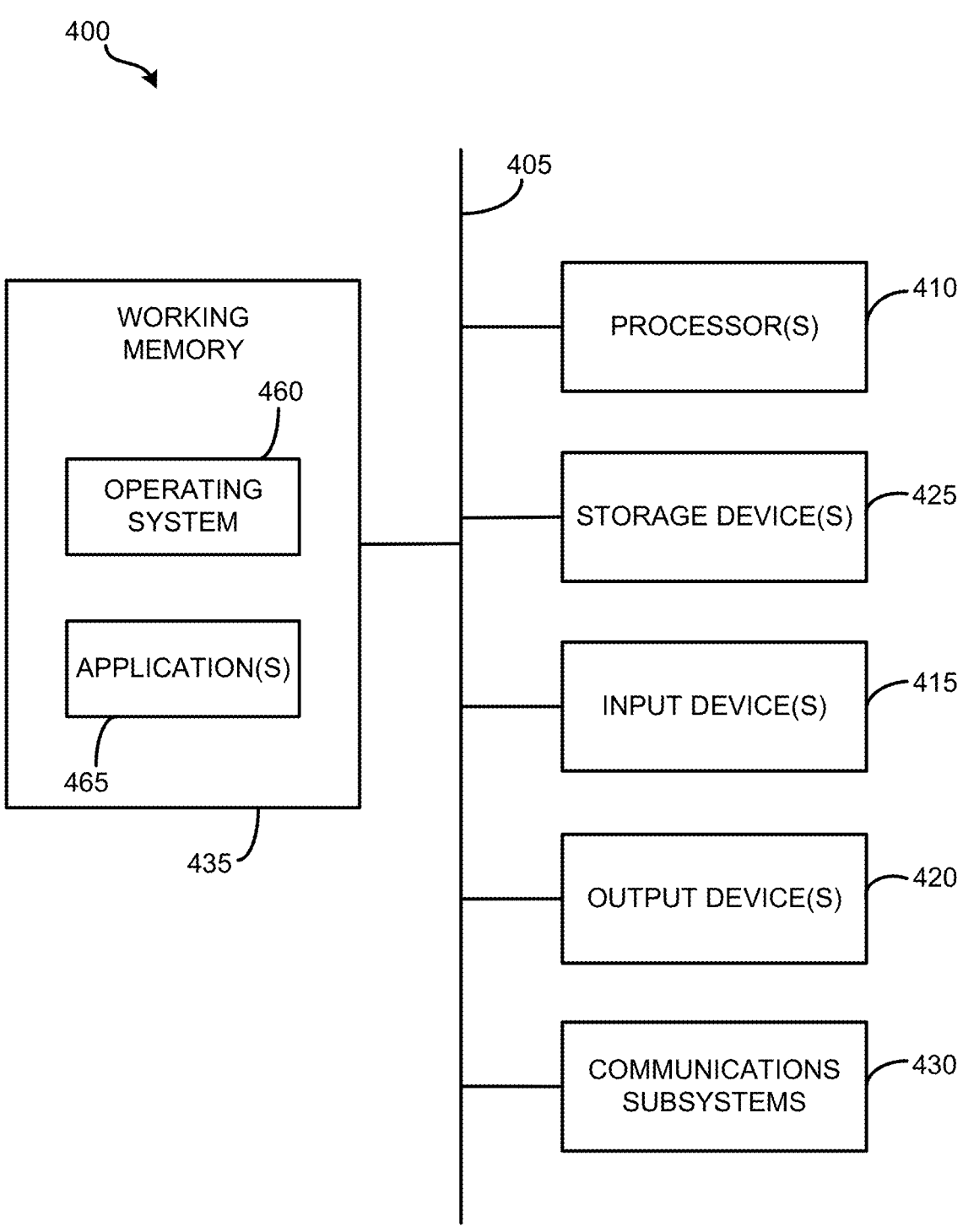
FIG. 4 illustrates an example computer system or computer device, according to various embodiments of the present disclosure.

The communications systems 100A-100C or any components thereof described above may include a computer system that further includes computer hardware and software that form special-purpose network circuitry to implement various embodiments such as communication, determination, identification, calculation, and other operations or steps of the methods described herein. FIG. 4 is a schematic diagram illustrating an example of computer system 400. The computer system 400 is a simplified computer system that can be used to implement various embodiments described and illustrated herein. FIG. 4 provides a schematic illustration of one embodiment of a computer system 400 that can perform some or all of the steps of the methods and workflows provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown including hardware elements that can be electrically coupled via a bus 405, or may otherwise be in communication, as appropriate. The hardware elements may include one or more processors 410, including without limitation one or more general-purpose processors and/or one or more special-purpose processors such as digital signal processing chips, graphics acceleration processors, and/or the like; one or more input devices 415, which can include without limitation a mouse, a keyboard, a camera, and/or the like; and one or more output devices 420, which can include without limitation a display device, a printer, and/or the like.

The computer system 400 may further include and/or be in communication with one or more non-transitory storage devices 425, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 430 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 430. In other embodiments, a portable electronic device, e.g., the first electronic device, may be incorporated into the computer system 400, e.g., an electronic device as an input device 415. In some embodiments, the computer system 400 will further include a working memory 435, which can include a RAM or ROM device, as described above.

The computer system 400 also can include software elements, shown as being currently located within the working memory 435, including an operating system 460, device drivers, executable libraries, and/or other code, such as one or more application programs 465, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 4, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 425 described above. In some cases, the storage medium might be incorporated within a computer system, such as computer system 400. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 400 and/or might take the form of source and/or installable code, which, upon compilation and/or installation on the computer system 400 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 400 to perform methods in accordance with various embodiments of the technology. According to a set of embodiments, some or all of the operations of such methods are performed by the computer system 400 in response to processor 410 executing one or more sequences of one or more instructions, which might be incorporated into the operating system 460 and/or other code, such as an application program 465, contained in the working memory 435. Such instructions may be read into the working memory 435 from another computer-readable medium, such as one or more of the storage device(s) 425. Merely by way of example, execution of the sequences of instructions contained in the working memory 435 might cause the processor(s) 410 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processor(s) 410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 430 and/or components thereof generally will receive signals, and the bus 405 then might carry the signals and/or the data, instructions, etc. carried by the signals to the working memory 435, from which the processor(s) 410 retrieves and executes the instructions. The instructions received by the working memory 435 may optionally be stored on a non-transitory storage device 425 either before or after execution by the processor(s) 410.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Various aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a game" includes a plurality of such games, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method comprising:
activating, by a user device in response to a first user input requesting for streaming, a streaming interface, wherein the streaming interface is presented on a display connected to the user device;
receiving, by the user device, streaming content of at least one content item from a service provider;
outputting, by the user device, the received streaming content for presentation and playback in the streaming interface;
activating an arcade interface of the user device, in response to a second user input requesting for gameplay, wherein the streaming interface and the arcade interface are concurrently co-presented on the display;
receiving, by the user device, gaming content of at least one cloud-hosted game from the service provider;
outputting, by the user device, the received gaming content for presentation and gameplay in the arcade interface; and
generating, periodically by an application being executed on the user device, a plurality of status messages, each status message being timestamped and comprising:
a header containing information about the at least one content item;
one or more playback states regarding the output of the received streaming content; and
one or more gameplay states regarding user interaction with the game;

transmitting the plurality of status messages to the service provider;
determining, by the service provider, a total duration of output content and a total duration of gameplay time, based on the plurality of status messages; and
mapping, by the service provider, a first reward to a user account associated with the user device based at least in part on the total duration of output content for the at least one content item and a second reward to the user account based at least in part on the total duration of gameplay time for the at least one cloud-hosted game, wherein the first reward is based at least in part on an inverse relationship to a playback rate of the output content.

2. The method of claim 1, wherein the received streaming content and gaming content are concurrently output to the streaming interface and arcade interface, respectively.

3. The method of claim 1, further comprising:
receiving, by the user device, a selection of an audio source from the group consisting of streaming content audio and gaming content audio.

4. The method of claim 1, wherein the streaming interface and the arcade interface are co-presented side-by-side on the display.

5. The method of claim 1, wherein the at least one content item comprises a plurality of content items, the at least one cloud-hosted game comprises a plurality of cloud-hosted games, and the method further comprises:
aggregating the first reward for each one of the plurality of content items; and
aggregating the second reward for each one of the plurality of cloud-hosted games.

6. The method of claim 1, wherein the plurality of status messages is generated at a frequency from once per one second to once per one minute.

7. The method of claim 1, wherein the one or more playback states of each status message indicate a current output streaming rate at the time when the status message is generated, and determining the total duration of output content further comprises:
determining a segment of output content for a time interval between every two successive status messages of the plurality of status messages by multiplying the time interval and the current output streaming rate indicated in the status message preceding the time interval; and
aggregating the segment of output content for each time interval.

8. The method of claim 1, wherein the one or more gameplay states of each status message indicate a current controller mode and a current controller state of a controller at the time when the status message is generated, the controller is connected to the user device, the controller mode is either a streaming mode configured to control the streaming content within the streaming interface or an arcade mode configured to control the gaming content within the arcade interface,
wherein determining the total duration of gameplay time further comprises:
identifying the status messages indicating the current controller mode being the arcade mode and the controller state being in use;
identifying a time interval between each one of the identified status message and the subsequent status message as a segment of gameplay time; and
aggregating the segment of gameplay time for each identified status message.

9. The method of claim 1, wherein the one or more playback states comprise at least one of media plays, media paused, media buffering, a play rate, a stream resolution, an output streaming rate, or a buffer rate.

10. A user device comprising:

one or more processors; and a computer-readable storage media storing computer-executable instructions, wherein the instructions, when executed by the one or more processors, cause the user device to:

activate a streaming interface in response to a first user input, wherein the streaming interface is presented on a display connected to the user device;

receive streaming content of at least one content item from a service provider in communication with the user device;

output the received streaming content for presentation and playback in the streaming interface;

activate an arcade interface on the user device, in response to a second user input requesting for gameplay, wherein the streaming interface and the arcade interface are concurrently co-presented on the display;

receive gaming content of at least one cloud-hosted game from the service provider;

output the received gaming content for presentation and gameplay in the arcade interface;

generate, periodically by an application being executed on the user device, a plurality of status messages, each status message being timestamped and comprising:

a header containing information about the at least one content item;

one or more playback states regarding the output of the received streaming content; and one or more gameplay states regarding user interaction with the game;

transmit the plurality of status messages to the service provider;

determine, by the service provider, a total duration of output content and a total duration of gameplay time, based on the plurality of status messages; and map, by the service provider, a first reward to a user account associated with the user device based at least in part on the total duration of output content for the at least one content item and a second reward to the user account based at least in part on the total duration of gameplay time for the at least one cloud-hosted game, wherein the first reward is based at least in part on an inverse relationship to a playback rate of the output content.

11. The user device of claim 10, wherein the streaming content and gaming content are concurrently output to the streaming interface and arcade interface, respectively.

12. The user device of claim 10, wherein the instructions, when executed by the one or more processors, further cause the user device to:

receive, by the user device, a selection of an audio source from the group consisting of streaming content audio and gaming content audio.

13. The user device of claim 10, wherein the streaming interface and the arcade interface are co-presented side-by-side on the display.

14. The user device of claim 10, wherein the instructions, when executed by the one or more processors, further cause the user device to:

receive a first notification from the service provider, the notification indicating a total duration of output content and a total duration of gameplay time determined by the service provider, based on the plurality of status messages.

15. The user device of claim 14, wherein the instructions, when executed by the one or more processors, further cause the user device to:

receive, from the service provider, a second notification indicating the first reward and the second reward to the user account associated with the user device, wherein the second reward is determined by the service provider based at least in part on the total duration of gameplay time for the at least one cloud-hosted game.

16. The user device of claim 10, wherein the plurality of status messages is generated at a frequency from once per one second to once per one minute.

17. The user device of claim 14, wherein the one or more playback states of each status message indicate a current output streaming rate at the time when the status message is generated, and the total duration of output content is determined by:

determining a segment of output content for a time interval between every two successive status messages of the plurality of status messages by multiplying the time interval and the current output streaming rate indicated in the status message preceding the time interval; and aggregating the segment of output content for each time interval.

18. The user device of claim 14, wherein the one or more gameplay states of each status message indicate a current controller mode and a current controller state of a controller at the time when the status message is generated, the controller is connected to the user device, the controller mode is either a streaming mode configured to control the streaming content within the streaming interface or an arcade mode configured to control the gaming content within the arcade interface, wherein the total duration of gameplay time is determined by:

identifying the status messages indicating the current controller mode being the arcade mode and the controller state being in use;

identifying a time interval between the each one of the identified status message and the subsequent status message as a segment of gameplay time; and aggregating the segment of gameplay time for each identified status message.

* * * * *